(12) United States Patent
Mekhanik et al.

(10) Patent No.: US 11,513,890 B1
(45) Date of Patent: Nov. 29, 2022

(54) ADAPTIVE READ SCRUB

(71) Applicant: Western Digital Technologies, Inc., San Jose, CA (US)

(72) Inventors: Evgeny Mekhanik, Rehovot (IL); Dudy David Avraham, Even Yehuda (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/332,727

(22) Filed: May 27, 2021

(51) Int. Cl.
| | |
|---|---|
| *G06F 16/2453* | (2019.01) |
| *G06F 16/22* | (2019.01) |
| *G06F 16/2455* | (2019.01) |
| *G06F 16/901* | (2019.01) |
| *G06F 9/4401* | (2018.01) |
| *G06F 9/50* | (2006.01) |
| *H04L 67/10* | (2022.01) |
| *G06F 3/06* | (2006.01) |
| *G06F 12/0893* | (2016.01) |
| *G06F 16/17* | (2019.01) |
| *G06F 11/10* | (2006.01) |
| *G06F 12/109* | (2016.01) |
| *G06F 16/23* | (2019.01) |
| *G06F 16/242* | (2019.01) |
| *H03M 7/30* | (2006.01) |
| *G06F 16/2457* | (2019.01) |
| *G06F 16/2458* | (2019.01) |
| *G06F 16/27* | (2019.01) |
| *G06F 7/24* | (2006.01) |
| *G06F 11/30* | (2006.01) |
| *G06F 11/07* | (2006.01) |

(52) U.S. Cl.
CPC .......... *G06F 11/106* (2013.01); *G06F 11/076* (2013.01); *G06F 11/1068* (2013.01); *G06F 11/3058* (2013.01)

(58) Field of Classification Search
CPC .. G06F 11/106; G06F 11/076; G06F 11/1068; G06F 11/3058
See application file for complete search history.

(56) References Cited

U.S. PATENT DOCUMENTS 9,471,418 B2* 10/2016 Ahn .................... G11C 7/14
2017/0147209 A1* 5/2017 Lee .................. G06F 3/0659

* cited by examiner

*Primary Examiner* — Guy J Lamarre
(74) *Attorney, Agent, or Firm* — Patterson & Sheridan, LLP; Steven H. VerSteeg

(57) ABSTRACT

A data storage device includes a memory device and a controller coupled to the memory device. The controller is configured to receive a read command form a host device, collect environment data of the memory device, decode data associated with the read command, determine a bit error rate (BER) of the decoded data, compare the BER to a threshold, and determine whether the data associated with the read command is to be relocated. The environment data includes temperature, number of program/erase cycles, amount of grown defects, number of past relocations and time since last data relocation. The controller is further configured to dynamically adjust the threshold based on the collected environment data and an amount of time that has passed since a last relocation of the read command data.

20 Claims, 6 Drawing Sheets

ADAPTIVE READ SCRUB

BACKGROUND OF THE DISCLOSURE

Field of the Disclosure

Embodiments of the present disclosure generally relate to redundant data eviction policies of data storage devices, such as solid state drives (SSDs), embedded memory storage devices, mobile memory storage devices, and automotive memory storage devices.

Description of the Related Art

During operations of a data storage device, such as a SSD, data eviction occurs as a result of read scrub scanning or as a result of a high bit error rate (BER) threshold cross notification during a host device or internal data read. The data eviction includes reading data from one location of the data storage device and programming the data to another location of the data storage device. In many instances, data eviction occurs due to abnormal environmental conditions, such as extra hot or extra cold temperatures (i.e., temperatures outside the normal operating temperature of the data storage device), data retention, or significant temperature delta between the temperature when the data was programmed and when the data is read.

In order to prevent potential data loss and ensure data reliability, the data storage device may implement various countermeasures, such as verifying the need for data eviction or re-acquiring the page/block level optimal read levels. When abnormal environmental conditions occur, reports of potential data loss may be in the tens of thousands due to block/block or wordline (WL)/WL variations between data populations written with the same conditions. The data storage device may not be able to verify each and every page or WL to determine whether the high BER notification is due to an abnormal environmental condition or if the innate BER is actually high. Furthermore, if the data storage device evicts the piece of data or a whole block, the evictions become visible and may decrease the performance of the data storage device. Additional negative effects include write amplification that impacts device endurance and data fragmentation caused by eviction of data fragments that impacts device performance.

Therefore, there is a need in the art for an improved data eviction policy.

SUMMARY OF THE DISCLOSURE

The present disclosure generally relates to data eviction policies of data storage devices, such as solid state drives (SSDs). A data storage device includes a memory device and a controller coupled to the memory device. The controller is configured to receive a read command form a host device, collect environment data of the memory device, decode data associated with the read command, determine a bit error rate (BER) of the decoded data, compare the BER to a threshold, and determine whether the data associated with the read command is to be relocated. The environment data includes temperature, number of program/erase cycles, amount of grown defects, number of past relocations, indications of data retention effect that the device may have passed in the past, and time since last data relocation. The controller is further configured to dynamically adjust the threshold based on the collected environment data and an amount of time that has passed since a last relocation of the read command data.

In one embodiment, a data storage device includes a memory device and a controller coupled to the memory device. The controller is configured to receive a read command from a host device, collect environment data of the memory device, wherein the environment data comprises temperature, number of program/erase cycles, amount of grown defects, number of past relocations, and time since last data relocation, decode data associated with the read command, determine that the decoded data has a bit error rate (BER), compare the BER to a threshold, and determine whether the data associated with the read command is to be relocated.

In another embodiment, a data storage device includes a memory device and a controller coupled to the memory device. The controller is configured to receive a read command from a host device, collect environment data for the memory device, dynamically adjust bit error rate (BER) thresholds based upon the collected environment data and an amount of time that has passed since a last relocation of data of the read command, and determine whether to relocate the data.

In another embodiment, a data storage device including memory means and a controller coupled to the memory means. The controller is configured to receive a read command from a host device, calculate a bit error rate (BER) for data associated with the read command, compare the BER to a threshold, wherein the threshold is a function of environmental conditions of the memory means and time since data of the read command has been relocated, and relocate the data to a different location in the memory means.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data eviction policies of data storage devices, such as solid state drives (SSDs). A data storage device includes a memory device and a controller coupled to the memory device. The controller is configured to receive a read command form a host device, collect environment data of the memory device, decode data associated with the read command, determine a bit error rate (BER) of the decoded data, compare the BER to a threshold, and determine whether the data associated with the read command is to be relocated. The environment data includes temperature, number of program/erase cycles, amount of grown defects, number of past relocations and time since last data relocation. The controller is further configured to dynamically adjust the threshold based on the collected environment data and an amount of time that has passed since a last relocation of the read command data.

Figure 1:
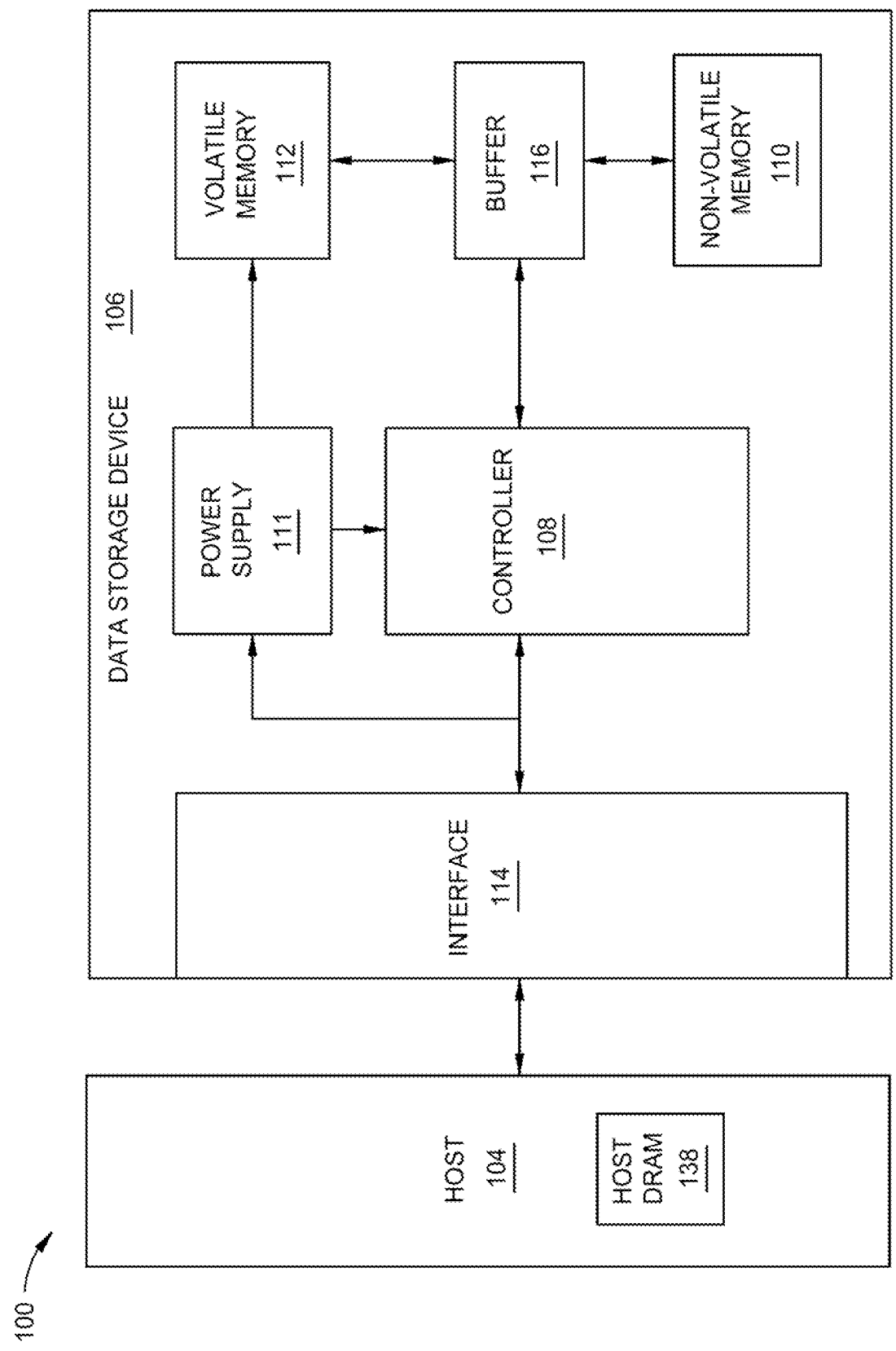
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

The interface 114 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an on-board backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, the controller 108 may use volatile memory 112 as a cache. For instance, the controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The controller 108 may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
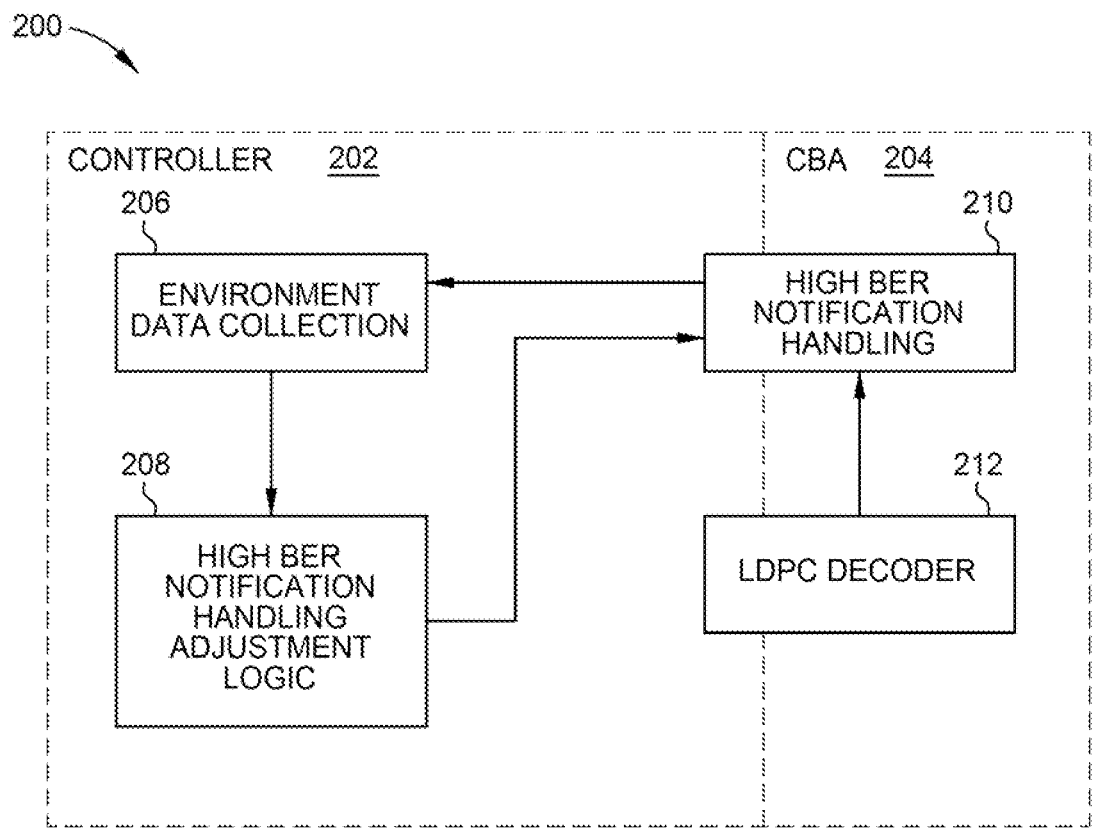
FIG. 2 is a schematic block diagram illustrating a controller system including a controller and a CMOS Bounded Array (CBA) of a data storage device, according to certain embodiments.

FIG. 2 is a schematic block diagram illustrating controller system 200 including a controller 202 and a CMOS Bounded Array (CBA) 204 of a data storage device, such as the data storage device 106 of FIG. 1, according to certain embodiments. The controller 202 includes an environment data collection unit 206 and a high bit error rate (BER) notification handling adjustment logic unit 208. The CBA 204 includes a high BER notification handling unit 210 and a low-density parity-check (LDPC) decoder 212. In some embodiments, the controller 202 may also include the high BER notification handling unit 210 and the LDPC decoder 212. It is to be understood that data storage devices may not include CBA infrastructure or the like and the embodiments herein may still be applicable to the controller 202. The CBA 204 is a logic layer that may be positioned adjacent to one or more memory devices of the plurality of memory devices of an NVM, such as the NVM 110 of FIG. 1. In some embodiments, the CBA 204 may instead be a CMOS Under Array (CUA) or a CMOS Above Array (CAA). It is to be understood that the units 206, 208, and 210 may be firmware executed by the controller 202 and/or the CBA 204.

When a read command is received by the controller 202, the controller 202 may forward the read command to the respective CBA 204, such that the CBA 204 executes the read command. The CBA 204 may locate the relevant data using a logical to physical (L2P) table that maps the logical block address (LBA) of the data to the physical block address (PBA) of the data. The LBA is provided by the host device, such as the host device 104 of FIG. 1, in the read command, where the LBA is utilized to determine where the data is stored in the relevant memory device.

After locating the data and reading the data from the location of the NVM 110, the CBA 204 decodes the data utilizing the LDPC decoder 212. The data may be encoded prior to storing the data in the NVM 110 to protect the data from grown errors while being stored or during storage of the data in the NVM 110. In order to be read by the host device or any other relevant device (including the controller 202), the encoded data need to be decoded. During the decoding process, the LDPC decoder 212 may determine whether any bit errors exists in the data. The number of bit errors may be characterized or calculated as a BER due to various sizes of data. After decoding the data, the decoded data is provided to the controller 202 and the BER may be provided to the high BER notification handling unit 210.

Concurrently to or while processing the read command by the CBA 204, the controller 202 may collect data regarding the environment conditions of the data storage device utilizing the environment data collection unit 206. The environment data includes temperature, number of program/erase cycles, amount of grown defects, number of past relocations, and time since last data relocation. The collection of environment data may be completed prior to executing or processing the read command, while the read command is being processed, or after the read command has been processed by the CBA 204. It is to be understood that the environment data collection unit 206 may collect environment data regarding the data storage device or one or more memory devices of the data storage device. For example, if the data associated with the read command is stored in a first memory device of a plurality of memory devices, the environment data collection 206 may either collect environment data of the data storage device or collect environment data of the first memory device and/or adjacent memory devices.

The environment data collected by the environment data collection unit 206 is passed to the high BER notification handling adjustment logic unit 208. The high BER notification handling adjustment logic unit 208 may determine that one or more BER thresholds are to be adjusted based on the environment data collected and a time since the last relocation of data for the relevant memory block or memory device. Table 1 below illustrates an embodiment of the one or more high BER thresholds, where the BER level describes the failed bit count (FBC), the syndrome weight (SW), and the like. The FBC is a number of failed bits, such as a bit that is no longer able to retain electrical charge or a bit that has the wrong electrical charge (i.e., wrong bit value). The SW is a property of the read codeword (i.e., the data that was encoded, written to a memory device, now read from the memory device, and decoded).

TABLE 1

| BER Level (FBC, SW, and the like) | Severity | Reaction |
| --- | --- | --- |
| <N | Green | Not needed |
| N < M | Blue (small performance concern) | Periodic monitoring, collecting environment data, and adjustment of periodic activities if needed |
| M < K | Yellow (major performance concern) | Asynchronous action - priority update of the read levels, conditions, move to safe die parallelism, etc. |
| K < P | Orange (mild REL concern) | Can be analyzed in background. A singular cross of this threshold should not cause any pro-active handling, while massive behavior notifies about a trend that needs to be solved by either data eviction, urgent parameters update, outlier tracking, etc. |
| >P | Red (Severe REL Concern) | A singular report shall be treated as requiring immediate data recovery/eviction. Report needs to be served immediately. |

The various BER thresholds may be dynamically adjusted based on the collected environment data and may be applicable to all of the memory devices or one or more memory devices. When the BER level is less than "N," the severity of the BER is indicated to be "green," where the data storage device may operate normally. However, when the BER level is greater than or equal to "N," the data storage device may require additional operations due to the BER exceeding a threshold. Furthermore, the number of BER levels is not set as shown in Table 1, rather, more or less BER levels may be arranged.

For example, when the BER level is between "N" and "M" (or greater than or equal to "N," but less than "M"), the severity is indicated to be "blue," where "blue" indicates that there may be a small performance concern. When the BER level is between "M" and "K" (or greater than or equal to "M," but less than "K"), the severity is indicated to be "yellow," where "yellow" indicates that there may be a major performance concern. When the BER level is between "K" and "P" (or greater than or equal to "K," but less than "P"), the severity is indicated to be "orange," where "orange" indicates that there may be a mild reliability (REL) concern. When the BER level is greater than "P" (or greater than or equal to "P"), the severity is indicated to be "red," where "red" indicates that there may be a severe REL concern. The various color indicators are not intended to be limiting, but to provide an example of a possible embodiment.

The various color indicators reflect different operating conditions that the data storage device may need to initiate. These proactive operations optimize data read operations to provide better and well-adapted reading voltages, time tag read parameters, temperature compensations, etc. In one embodiment, the operations cause a decrease in toggle mode (TM) speed to have a better signal integrity during read operations and subsequently decrease the read and read transfer failed bit count, etc. For example, when the severity is "blue," the controller 202 may initiate periodic monitoring of the one or more memory devices, collecting environment data regarding the data storage device and/or the one or more memory devices, and adjustment of periodic activities, if needed. When the severity is "yellow," the controller 202 may initiate an asynchronous action that may include a priority update of read levels, collecting environment data, preparing to move the data to a safe die parallelism, and the like. When the severity is "orange," the controller 202 may initiate data analyzation in the background so that the data having the BER is more closely analyzed. Furthermore, when the severity is "orange," a singular cross of the threshold (i.e., greater than or equal to "K," but less than "P") may not cause any pro-active data reliability handling, while multiple crosses of the threshold may indicate to the controller 202 a BER trend that may need to be remedied. Such remedies may include data eviction, urgent parameter updates, outlier tracking, and the like. When the severity is "red," each report received by the controller 202 is initiates a data recovery/eviction process. The controller 202 may serve each of the reports immediately or place the report high on a priority queue.

As stated previously, the one or more BER thresholds may be adapted by the high BER notification adjustment logic unit 208 based on the collected environment data from the environment data collection unit 206, while taking into account the time since the last relocation of data for the relevant memory block or memory device. The high BER notification adjustment logic unit 208 may dictate the policy regarding the BER threshold, such as if temp>X[C], and modify N, M, K, and P from Table 1, or change the number of different BER thresholds and/or categories. The updated or changed BER thresholds (e.g., Table 1) are sent to the high BER notification handling unit 210. It is to be understood that the one or more BER thresholds may be specific to a thermal region, type of data, freshness of the data (i.e., how recently the data was programed), and the like. For example, the one or more BER thresholds may be increased upon determining that the environmental conditions, which may include a time since previously relocating data, are not sufficient to justify relocating data. The environmental conditions may be collected continuously or in response to a high BER notification.

The high BER notification handling adjustment logic unit 208 may be a learning control system, such as a reinforcement learning (RL) system, that learns the optimal read scrub policy (i.e., data retention/eviction policy) on-the-fly by utilizing the plurality of quantized BER states (or thresholds) and the environment data, such as temperature and program/erase cycles (PEC), of the data storage device and/or the one or more memory devices. For example, the learning control system may optimize the delayed long term reward of the controller 202, such that the controller 202 may optimize postponing relocation by either increasing a timeframe to execute a relocation request or decreasing a timeframe to execute a relocation request by deriving conclusions regarding successful and failed relocations. Therefore, the one or more BER thresholds may be dynamically adjusted based on the learning control system.

The optimization may be due to the environment conditions as well as a time since the last relocation of data for the relevant memory block or memory device. The learning control system may provide the optimal read scrub policy with delayed rewards in order to provide optimal performance for long periods of times and change/adapt the policy during the operations of the data storage device. By optimizing the policy, the number of "failed relocations" may decrease, where each "failed relocation" may detrimentally increase the write amplification (WA) of a block, and the performance of the data storage device may increase.

The high BER notification handling unit 210 receives a BER from the LDPC decoder 212 and compares the BER to the one or more BER thresholds. Based on comparison between the BER and the one or more BER thresholds, the controller 202 may initiate data recovery/eviction policies if necessary, such as those described in Table 1. The high BER notification handling unit 210 may also wait to compare the BER to the one or more BER thresholds until after the updated or changed BER thresholds are received from the high BER notification handling adjustment logic unit 208.

Figure 3:
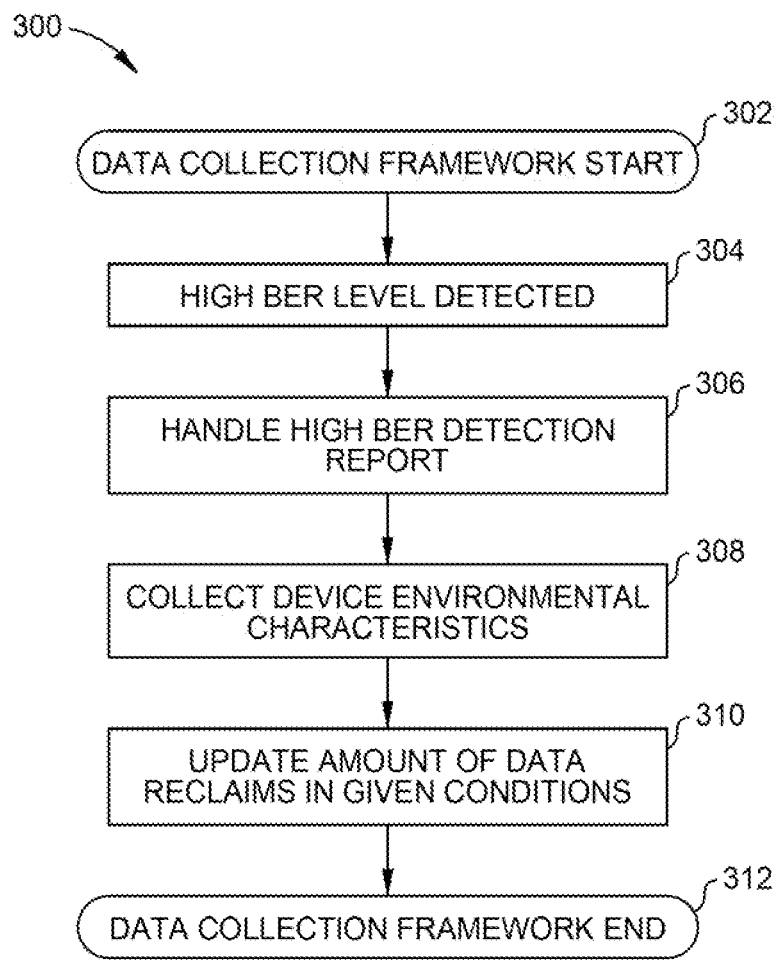
FIG. 3 is a schematic flow diagram illustrating a method of data collection, according to certain embodiments.

FIG. 3 is a schematic flow diagram illustrating a method 300 of data collection, according to certain embodiments. The method 300 may be executed by the controller system 200 of FIG. 2 and aspects of the controller system 200 may be referenced for exemplary purposes. At block 302, the data collection framework begins. The data collection framework may begin when a read command to read data from an NVM, such as the NVM 110 of FIG. 1, is executed. At block 304, a high BER level is detected by the LDPC decoder 212. In various embodiments, the high BER level may be detected via a host device, such as the host device 104 of FIG. 1, read operation, the LDPC decoder 212 decoding the data associated with the read command, or proactive read scrub algorithms. When the high BER level is detected, the BER is passed to the high BER notification handling unit 210.

At block 306, the high BER notification handling unit 210 handles the high BER detection report. The handling may include deciding whether the data should be evacuated, re-acquiring optimal read levels if needed, updating the amount of data evictions and/or reclaims, and updating statistical counters of high BER/data reclaim reports at given conditions. At block 308, the environment data collection unit 206 collects environment statistics or environment data of the data storage device and/or the one or more memory devices. The environment statistics or environment data collected may include the temperature of the data storage device and/or the one or more memory devices, the data retention indications, and the data storage device health metrics (and/or the health metrics of the one or more memory devices). The health metrics may include the number of program/erase cycles, the amount of grown defects, the number of relinks, and the like. At block 310, the amount of data reclaims in the given conditions are updated. Data reclaims may refer to reclaiming storage space of a memory device, where outdated or invalid data has been erased. Specifically, data reclaims may be the amount of data that has been evicted and programmed in a different location due to data reliability concerns. At block 312, the data collection framework ends.

It is contemplated that the lists provided at blocks 304, 306, and 308 are not limiting and other embodiments and/or combinations may be applicable to those described above.

Figure 4:
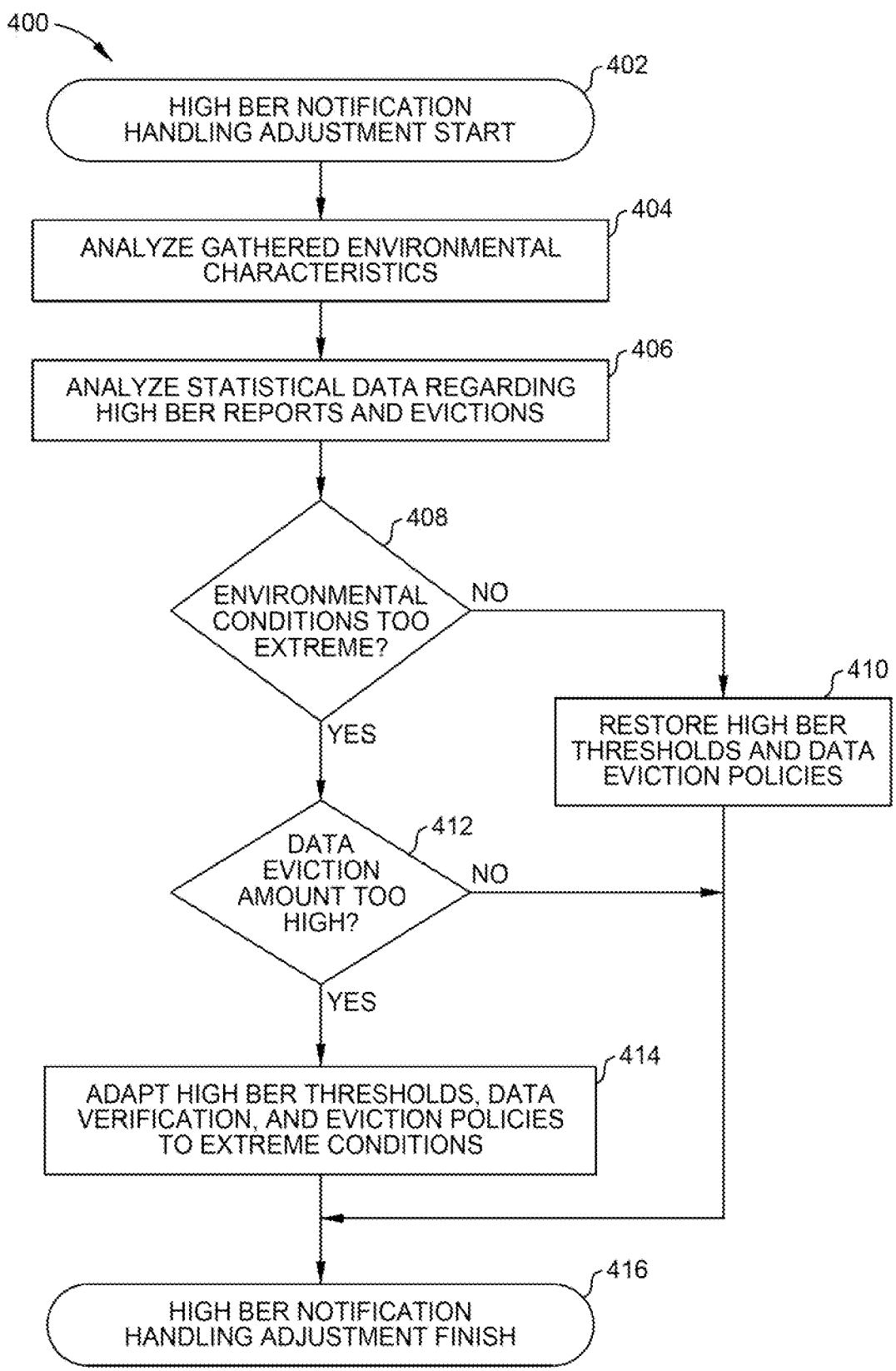
FIG. 4 is a schematic flow diagram illustrating a method of a high bit error rate (BER) notification handling adjustment, according to certain embodiments.

FIG. 4 is a schematic flow diagram illustrating a method 400 of a high BER notification handling adjustment, according to certain embodiments. The method 400 may be executed by the controller system 200 of FIG. 2 and aspects of the controller system 200 may be referenced for exemplary purposes. At block 402, the high BER notification handling adjustment starts. The high BER notification handling adjustment may be completed by the high BER notification adjustment logic unit 208.

At block 404, the high BER notification adjustment logic unit 208 analyzes the gathered environment characteristics (e.g., the environment statistics and/or environment data collected at block 308 of the method 300). The analyzing may include analyzing data retention indications, temperature conditions, amount of data written and read in different conditions, and the amount of data reclaims (i.e., the amount of data evicted and programmed in a different location due to data reliability concerns). At block 406, the high BER notification adjustment logic unit 208 analyzes the statistical data regarding high BER reports and evictions. The analyzing may include analyzing the amount of times that the high BER thresholds have been exceeded with respect to environment conditions, the amount of times that the optimal read levels for read optimization have been re-acquired, the amount of times data evictions have occurred in specific thermal/environment conditions, the rate of successful/failed data evictions per set of conditions, and a time since the last relocation of data for the relevant memory block or memory device.

It is contemplated that the lists provided at blocks 404 and 406 are not limiting and other embodiments and/or combinations may be applicable to those described above.

At block 408, the high BER notification handling adjustment logic unit 208 determines if the environment conditions are too extreme. For example, extreme environment conditions may include an operating temperature that is outside of normal operating temperatures. If the environment conditions are not too extreme, the high BER notification handling adjustment logic unit 208 restores the high BER thresholds and data eviction policies, such as keeping the same policies as those in a previous operation or returning to a pre-defined set of policies, at block 410. After restoring the high BER thresholds and data eviction policies at block 410, the high BER notification handling adjustment finishes at block 416.

However, if the high BER notification handling adjustment logic unit 208 determines that the environment conditions are too extreme, then at block 412, the high BER notification handling adjustment logic unit 208 determines if the data eviction amount is too high. For example, a high data eviction amount may correspond to a plurality of failed relocations or a relocation that recently happened, such as within a threshold timeframe. If the data eviction amount is not too high at block 412, then the method 400 finishes at block 416. However, if the data eviction amount is too high at block 412, then at block 414, the high BER thresholds, data verification, and eviction policies are adapted for the extreme conditions. The adapting may include adjusting one or more BER thresholds, adding or removing one or more BER thresholds, and the like. For example, the one or more BER thresholds may be increased upon determining that the environmental conditions, which may include a time since previously relocating data, are not sufficient to justify relocating data. At block 416, the high BER notification handling adjustment finishes and the one or more BER thresholds may be provided to the high BER notification handling unit 210.

Figure 5:
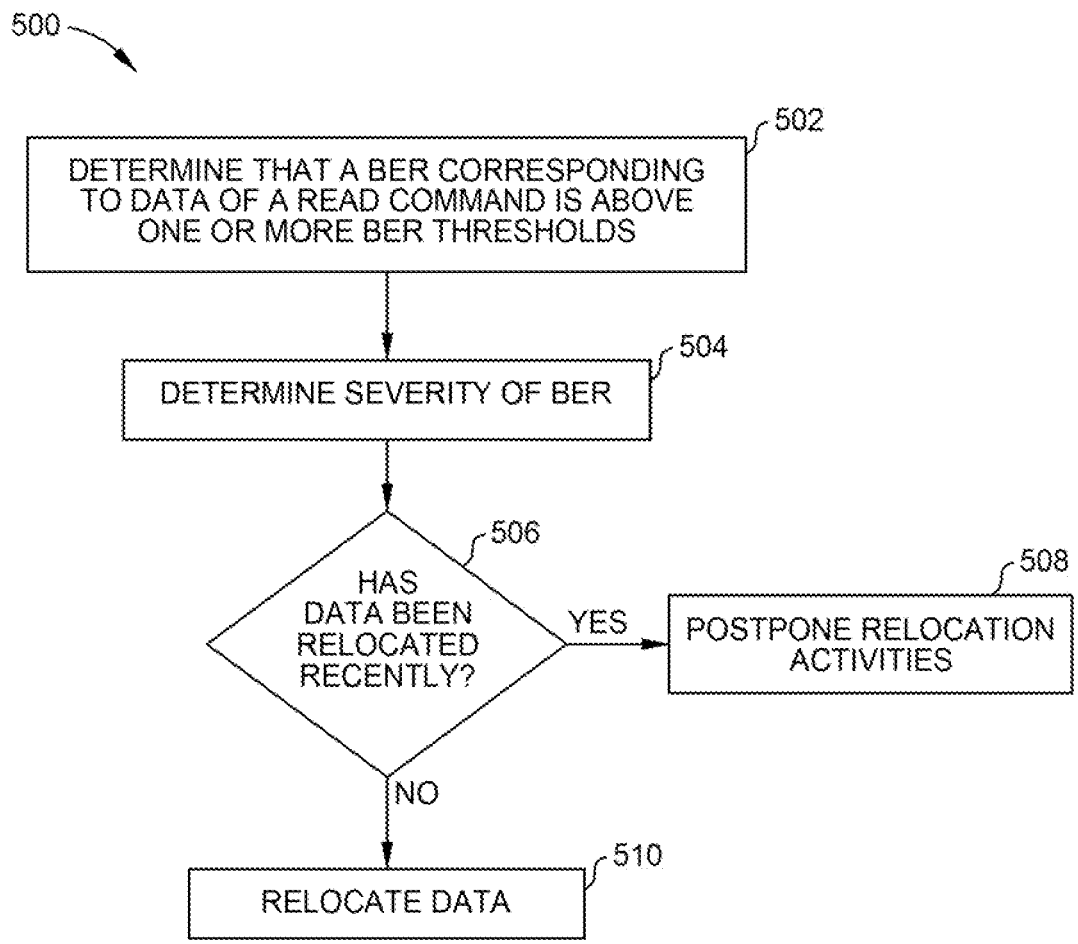
FIG. 5 is a schematic flow diagram illustrating a method of a data eviction policy, according to certain embodiments.

FIG. 5 is a schematic flow diagram illustrating a method 500 of a data eviction policy, according to certain embodiments. The method 500 may be executed by the controller system 200 of FIG. 2 and aspects of the controller system 200 may be referenced for exemplary purposes. At block 502, the high BER notification handling unit 210 determines that a BER corresponding to data of a read command is above at least the lowest BER threshold, where the lowest BER threshold corresponds to a BER level that is less than "N" as depicted in Table 1 above.

At block 504, the high BER notification handling 210 determines the severity of the BER by comparing the BER to the one or more BER thresholds. The one or more BER thresholds may be the thresholds depicted in Table 1 above. For example, the BER of the data may be greater than or equal to "N," but below "M," which may trigger a response indicative of a "blue" severity. Furthermore, the one or more BER thresholds may be set by the high BER notification handling adjustment logic unit 208, where the one or more thresholds are adjusted based on collecting environment data by the environment data collection unit 206 either before or during the decoding of read data associated with a read command.

At block 506, the high BER notification handling unit 210 determines if the data has been relocated recently. If the data has been relocated recently at block 506, then at block 508, the relocation activities, such as data eviction, is postponed. Postponing the relocation activities may further include re-collecting of environment data and analyzation of the environment data. However, if the data has not been relocated recently 506, then the data is relocated as part of the data eviction policy at block 510.

It is to be understood that whether data has been recently relocated can be based upon a predetermined threshold that may be set by the user or preset by the data storage device. Furthermore, the threshold may be adjusted as the data storage device ages or the user changes the threshold. It is to be understood that the relocation of data can be based not only on BER, but also on time since last data relocation. Hence, the data relocation may be based upon BER rate; time since data relocation; or a combination of BER rate and time since data relocation.

Figure 6:
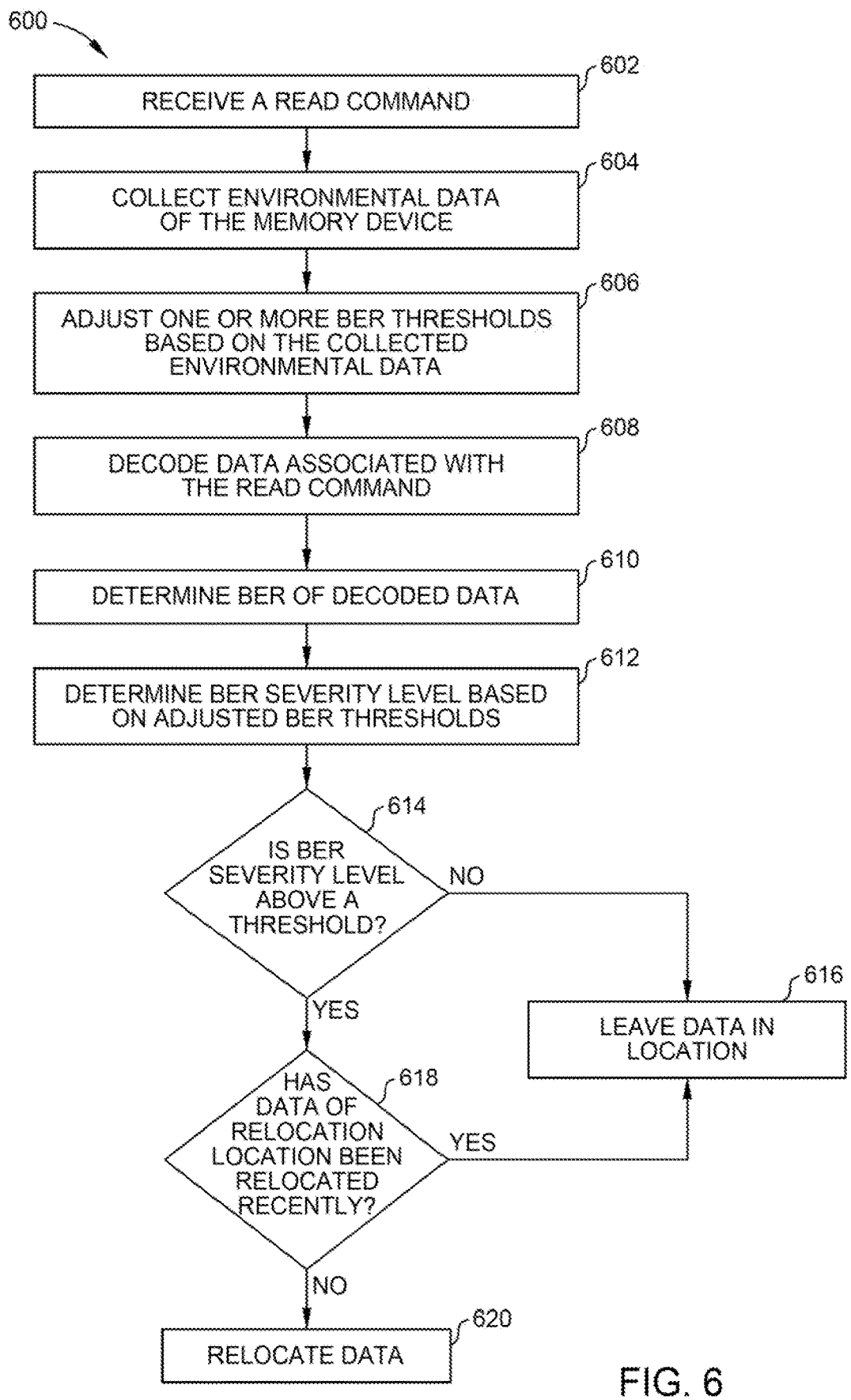
FIG. 6 is a schematic flow diagram illustrating a method of a data eviction policy, according to certain embodiments.

FIG. 6 is a schematic flow diagram illustrating a method 600 of a data eviction policy, according to certain embodiments. The method 600 may be executed by the controller system 200 of FIG. 2 and aspects of the controller system 200 may be referenced for exemplary purposes. At block 602, the controller 202 receives a read command from a host device, such as the host device 104 of FIG. 1. At block 604, the environment data of the memory device is collected. In some embodiments, the environment data of the data storage device is collected. In other embodiments, the environment data of one or more memory devices, such as the memory devices positioned adjacent to the target memory device, is collected. The collection of the environment data may be completed by the environment data collection unit 206.

At block 606, the one or more BER thresholds are adjusted based on the collected environment data by the high BER notification handling adjustment logic unit 208. The one or more BER thresholds may also be adjusted with respect to a time since the last relocation of data for the relevant memory block or memory device. For example, the one or more BER thresholds may be increased upon determining that the environmental conditions, which may include a time since previously relocating data, are not sufficient to justify relocating data. The conditions of relocation are determined by two factors: actual BER severity of the specific report and system environmental conditions.

In regards to BER severity, in the case of 'red' severity or maximum severity, the data will be relocated even if a relocations has already happened shortly therebefore, regardless of the environmental conditions. Contrarily, in the case of a medium or 'yellow' or less than maximum severity, the reporting system will gather the counters and once the counters reach a predetermined limit will issue an optimization process. If 'yellow' reports continue even afterwards, and the environmental conditions become normal, the system will trigger the relocation of the data. Stated another way, a time limit is not taken into consideration for the process. Furthermore, in some embodiments, the adjusting may include adding or removing one or more BER thresholds. At block 608, the data associated with the read command is decoded by the LDPC decoder 212. It is to be understood that the collection of environment data at block 604 and the adjusting of the one or more BER thresholds at block 606 may be completed prior to decoding the data associated with the read command, while the data associated with the read command is being decoded, or after determining that the decoded data has a BER above a threshold. At block 610, the BER of the decoded data is determined by the LDPC decoder 212.

At block 612, the high BER notification handling unit 210 determines the BER severity level based on the adjusted one or more BER thresholds. For example, the adjusted on or more BER thresholds may be the thresholds depicted in Table 1 above. At block 614, the high BER notification handling unit 210 determines if the BER severity level is above a minimum threshold. For example, the minimum threshold to trigger a response from the controller 202 or the CBA 204 may be a BER level greater than or equal to "N." Furthermore, if the high BER notification handling unit 210 determines that the BER level is greater than or equal to "N," but less than "P," then at block 616, the data may not be evicted, but rather more closely monitored.

The time between data relocation can beneficial, and considered, in some instances. For example, if data relocation from a first location to a second location due to temperature changes and shortly again from the second location back to the first location to temperature changes, then the time between relocations can be considered, along with the environmental factors, to indicate that there is an issue that needs addressed. Alternatively, if the relocation occurs from the first location to a second location due to temperature changes, and shortly thereafter from the second location to a third location due to temperature changes, then the time between relocations is generally irrelevant.

By adapting one or more BER thresholds of a read scrub policy and/or a data eviction policy based on collected environment and a time since the last relocation of data for the relevant memory block or memory device, redundant or unnecessary data relocations may be decreased, which may reduce the amount of data fragmentations due to excessive high BER notifications. Furthermore, the overall BER of the system may be decreased, which may lead to higher throughput, lower power consumption and better endurance as a result of less program/erase cycling and a lower write amplification of the memory devices.

In one embodiment, a data storage device includes a memory device and a controller coupled to the memory device. The controller is configured to receive a read command from a host device, collect environment data of the memory device, wherein the environment data comprises temperature, number of program/erase cycles, amount of grown defects, number of past relocations, and time since last data relocation, decode data associated with the read command, determine that the decoded data has a bit error rate (BER), compare the BER to a threshold, and determine whether the read command data is to be relocated.

The collecting the environmental data is in response to determining the BER is above the threshold. The collecting the environmental data occurs prior to or during decoding of the data. The threshold is dynamic. The controller is further configured to adjust the threshold based upon an amount of time that has passed since a previous data relocation. The controller includes a BER notification handling unit that is configured to trigger collection of the environmental data. The controller further includes a BER notification adjustment unit that is configured to adjust the threshold based upon the environmental data. The BER notification adjustment unit is firmware. The controller further includes an environment data collection unit for collecting environmental data, wherein the environmental data collection unit is firmware.

In another embodiment, a data storage device includes a memory device and a controller coupled to the memory device. The controller is configured to receive a read command from a host device, collect environment data for the memory device, dynamically adjust bit error rate (BER) thresholds based upon the collected environment data and an amount of time that has passed since a last relocation of data of the read command, and determine whether to relocate the data.

The controller is further configured to update statistical counters of high BER/data reclaim reports at particular environmental conditions. The controller is configured to collect the environmental data in response to determining that decoded data associated with the read command has a BER above a first BER threshold of the BER thresholds. The controller is further configured to analyze the environmental data for data retention indications, temperature conditions, amount of data written and read in different conditions, amount of data reclaims, or combinations thereof. The controller is further configured to analyze collected data regarding an amount of BER thresholds exceeded and corresponding environmental conditions. The controller is further configured to analyze collected data regarding an amount of data evictions in specific thermal and/or environmental conditions. The controller is further configured to analyze collected data regarding a rate of successful or failed data eviction per specific thermal and/or environmental conditions.

In another embodiment, a data storage device including memory means and a controller coupled to the memory means. The controller is configured to receive a read command from a host device, calculate a bit error rate (BER) for data associated with the read command, compare the BER to a threshold, wherein the threshold is a function of environmental conditions of the memory means and time since data of the read command has been relocated, and relocate the data to a different location in the memory means.

Upon comparing the BER to the threshold, the controller is further configured to perform periodic monitoring, collecting environmental conditions, and adjust device activities. The controller is further configured to increase the threshold upon determining environmental conditions are not sufficient to justify relocating data. The controller is further configured to relocate the data upon determining the threshold is exceeded.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a read command from a host device;
collect environment data of the memory device, wherein the environment data comprises temperature, number of program/erase cycles, amount of grown defects, number of past relocations, and time since last data relocation;
adjust one or more bit error rate (BER) thresholds of a plurality of BER thresholds based on the collected environment data;
read data from the memory device in accordance with the read command;
decode the data associated with the read command;
determine a BER of the decoded data;
compare the BER to each BER threshold of the plurality of BER thresholds; and
perform an action based on the comparing, wherein the action is selected from a group consisting of:
periodic monitoring, re-collecting of the environment data, and adjustment of periodic activities;
priority updating of one or more read levels corresponding to the data read from the memory device, re-collecting of the environment data, and preparing to move the data read from the memory device to a different location of the memory device;
periodic re-acquiring of the BER corresponding to the data read from the memory device in a background operation; and
data eviction or data recovery of the data read from the memory device.

2. The device of claim 1, wherein collecting the environment data is in response to determining the BER is above the threshold.

3. The device of claim 1, wherein collecting the environment data occurs prior to or during decoding of the data.

4. The device of claim 1, wherein the threshold is dynamic.

5. The device of claim 1, wherein the controller is further configured to adjust the threshold based upon an amount of time that has passed since a previous data relocation.

6. The device of claim 1, wherein the controller comprises a BER notification handling unit that is configured to trigger collection of the environment data.

7. The device of claim 1, wherein the controller further comprises a BER notification adjustment unit that is configured to adjust the one or more BER thresholds based upon the environment data.

8. The device of claim 7, wherein the BER notification adjustment unit is firmware.

9. The device of claim 1, wherein the controller further comprises an environment data collection unit for collecting environment data, wherein the environment data collection unit is firmware.

10. A data storage device, comprising:
a memory device; and
a controller coupled to the memory device, wherein the controller is configured to:

receive a read command from a host device;
read data from the memory device based on the read command;
collect environment data for the memory device;
dynamically adjust one or more bit error rate (BER) thresholds of a plurality of BER thresholds based upon the collected environment data and an amount of time that has passed since a last relocation of the data read from the memory device;
determine a BER of the data read from the memory device;
compare the BER to each BER threshold of the plurality of BER thresholds; and
perform an action based on the comparing, wherein the action is selected from a group consisting of:
periodic monitoring, re-collecting of the environment data, and adjustment of periodic activities;
priority updating of one or more read levels corresponding to the data read from the memory device, re-collecting of the environment data, and preparing to move the data read from the memory device to a different location of the memory device;
periodic re-acquiring of the BER corresponding to the data read from the memory device in a background operation; and
data eviction or data recovery of the data read from the memory device.

11. The device of claim 10, wherein the controller is further configured to update statistical counters of high BER/data reclaim reports at particular environment conditions.

12. The device of claim 10, wherein the controller is configured to collect the environment data in response to determining that decoded data has a BER above a first BER threshold of the plurality of BER thresholds.

13. The device of claim 10, wherein the controller is further configured to analyze the environment data for data retention indications, temperature conditions, amount of data written and read in different conditions, amount of data reclaims, or combinations thereof.

14. The device of claim 10, wherein the controller is further configured to analyze collected data regarding an amount of BER thresholds exceeded and corresponding environment conditions.

15. The device of claim 10, wherein the controller is further configured to analyze collected data regarding an amount of data evictions in specific thermal and/or environment conditions.

16. The device of claim 10, wherein the controller is further configured to analyze collected data regarding a rate of successful or failed data eviction per specific thermal and/or environment conditions.

17. A data storage device, comprising:
memory means; and
a controller coupled to the memory means, wherein the controller is configured to:
receive a read command from a host device;
calculate a bit error rate (BER) for data associated with the read command;
compare the BER to each BER threshold of a plurality of BER thresholds, wherein each BER threshold is a function of environment conditions of the memory means, wherein the environment conditions comprises a temperature of the memory means, a number of program/erase cycles of the memory means, an amount of grown defects of the memory means, a number of past relocations of the memory means, and a time since last data relocation of the memory means; and
perform an action based on the comparing, wherein the action is selected from a group consisting of:
periodic monitoring, re-collecting of the environment conditions, and adjustment of periodic activities;
priority updating of one or more read levels corresponding to the data read from the memory device, re-collecting of the environment conditions, and preparing to move the data read from the memory device to a different location of the memory device;
periodic re-acquiring of the BER corresponding to the data read from the memory device in a background operation; and
data eviction or data recovery of the data read from the memory device.

18. The device of claim 17, wherein the controller is further configured to adjust one or more BER thresholds of the plurality of BER thresholds based on collected environment conditions of the data storage device.

19. The device of claim 17, wherein the controller is further configured to increase one or more BER thresholds of the plurality of BER thresholds upon determining the environment conditions are not sufficient to justify relocating data.

20. The device of claim 17, wherein the controller is further configured to relocate the data upon determining a BER threshold of the plurality of BER thresholds is exceeded.

* * * * *